US005876551A

United States Patent [19]

Jackson

[11] Patent Number: 5,876,551

[45] Date of Patent: Mar. 2, 1999

[54] BREATHABLE WALLCOVERING

[75] Inventor: Dan L. Jackson, Starkville, Miss.

[73] Assignee: GenCorp Inc., Fairlawn, Ohio

[21] Appl. No.: 937,429

[22] Filed: Sep. 25, 1997

Related U.S. Application Data

[62] Division of Ser. No. 216,221, Mar. 22, 1994.

[51] Int. Cl.[6] .................... C09J 5/02

[52] U.S. Cl. .................... 156/307.4; 156/272.2; 156/307.3; 156/307.5; 427/278; 427/304; 427/328; 427/407.1

[58] Field of Search .................... 427/407.1, 278, 427/388.5, 304, 328, 405; 156/278, 272.2, 276, 296, 298, 304.4, 307.3, 307.5, 305, 307.2

[56] References Cited

U.S. PATENT DOCUMENTS

| | | | |
|---|---|---|---|
| 3,652,374 | 3/1972 | Condon . | |
| 3,958,043 | 5/1976 | McKee, Jr. et al. . | |
| 3,958,054 | 5/1976 | McKee, Jr. et al. . | |
| 4,146,520 | 3/1979 | Bierwirth et al. . | |
| 4,401,720 | 8/1983 | Davis et al. | 428/483 |
| 4,427,731 | 1/1984 | Gibson . | |
| 4,614,556 | 9/1986 | Fry et al. . | |
| 4,614,680 | 9/1986 | Fry et al. . | |
| 4,650,704 | 3/1987 | Rothenberg . | |
| 4,710,422 | 12/1987 | Fredenucci . | |
| 4,713,264 | 12/1987 | Clarke et al. . | |
| 4,759,816 | 7/1988 | Kasper et al. . | |
| 4,767,580 | 8/1988 | Shingo et al. . | |
| 4,804,572 | 2/1989 | Bodrogi . | |
| 4,822,641 | 4/1989 | Weik | 427/250 |
| 5,000,810 | 3/1991 | Silverstein . | |
| 5,071,680 | 12/1991 | Charles et al. | 427/278 |
| 5,198,293 | 3/1993 | Metrick . | |
| 5,262,444 | 11/1993 | Rusincovitch et al. . | |
| 5,506,030 | 4/1996 | Laudes et al. | 428/143 |

*Primary Examiner*—Merrick Dixon
*Attorney, Agent, or Firm*—Robert F. Rywalski; Daniel J. Hudak

[57] ABSTRACT

A breathable, decorative wallcovering having a smooth, continuous, aesthetically appealing exposed surface which can be printed with a design or pattern having sharply defined edges, and having a relatively high moisture permeability, includes a porous polymeric ply fused to and supported by a nonwoven substrate ply which consists of an array of hydroentangled fibers. The porous polymeric ply is formed by thermally fusing a plastisol coating, which is applied to the nonwoven substrate ply, and which has a thickness sufficiently low to permit localized variations in fiber orientation and small variations in the thickness of the nonwoven substrate ply to cause the formation of a multiplicity of miniature discontinuities which are substantially invisible to the unaided eye and which are randomly distributed throughout the coating. The plastisol coating is, however, thick enough to allow the formation of a coating which upon thermal fusion provides a polymeric ply having a smooth continuous appearance. Upon heating the plastisol coating to a temperature which is sufficient to cause fusion of resins contained therein, a highly permeable polymeric ply having the appearance of a smooth, continuous film is formed. The wallcovering is particularly useful where a smooth surface is desired for aesthetic reason and where high moisture permeability is also desired.

5 Claims, 1 Drawing Sheet

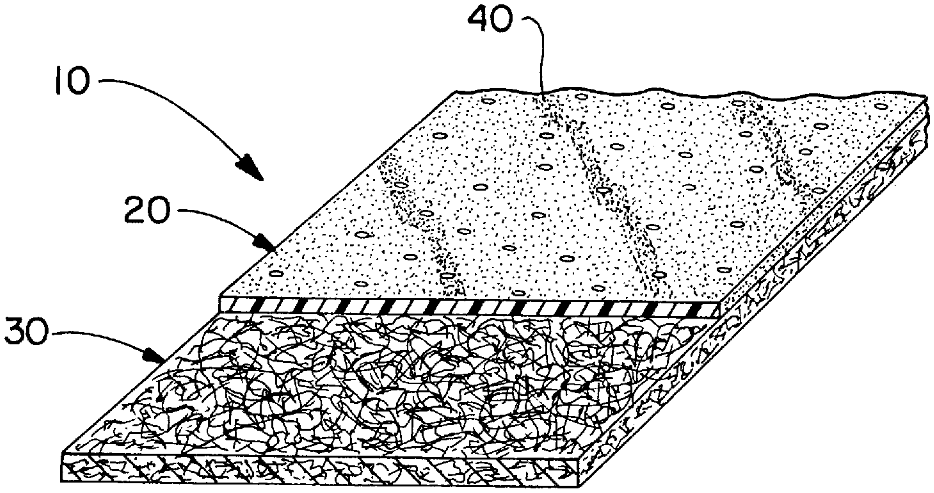
40
10
20
30

BREATHABLE WALLCOVERING

CROSS-REFERENCE

This is a division of application Ser. No. 08/216,221, filed on Mar. 22, 1994, of Dan L. Jackson, for "BREATHABLE WALLCOVERING," pending.

FIELD OF THE INVENTION

This invention relates to breathable wallcoverings which permit moisture vapor to freely pass therethrough to aid in the control or prevention of mold or mildew growth between the wallcovering and a supporting substrate. More particularly, the invention pertains to decorative, breathable wallcoverings which have a smooth aesthetic appearance.

BACKGROUND OF THE INVENTION

Conventional vinyl wallcoverings are often relatively impervious to moisture and can actually serve as an effective moisture barrier. While moisture impermeability can be desirable in many wallcovering applications, such as in bathrooms and kitchens, moisture impermeable wallcoverings can cause problems in extremely humid climates. Under conditions of high humidity, moist air can permeate the building walls from the exterior inwardly and condense between the wall and the wallcovering on account of the difference between the inside and outside temperature. The low moisture permeability of conventional vinyl wallcoverings prevents moisture and condensate from passing through into the room at a rate equal to the rate at which moisture permeates inwardly through the building walls, thereby causing accumulation of moisture at the side of the wallcovering facing the wall. The trapped water between the wallcovering and the wall provides an excellent medium for growth of molds and mildew on account of the presence of the wallcovering paste which generally contains organic materials which serve as nutrients for sustaining the growth of molds and mildew. Because of the ubiquitous nature of mold and mildew spores, it is almost inevitable that any accumulation of moisture at the interface between a wall and wallcovering will lead to the growth of molds or mildew. Such growth is generally accompanied by staining or discoloration of the wallcovering and by the presence of offensive odors. Conventional vinyl wallcoverings generally have a moisture permeability of about 1 or 2 Perms.

U.S. Pat. No. 5,262,444 to Rusincovitch et al. discloses a breathable, plastic film, useful as a wallcovering material, which is prepared by combining a plastisol with a low boiling point additive, extruding the plastisol mixture containing the low boiling point additive to form a film, and curing the film under conditions whereby the additive volatilizes through the cured film to form a multiplicity of holes in the film. The reference reports Perm values generally ranging from about 1.0 to about 20.0. While the Rusincovitch et al. patent generally reports Perm values which are considerably higher than those of conventional vinyl wallcoverings, still higher moisture permeabilities would be advantageous and desirable.

Pending U.S. patent application Ser. No. 08/013,911, filed Feb. 5, 1993, discloses a moisture-permeable acoustic lamina, suitable for use as a wallcovering, which comprises a woven fabric adhered to a fabric backing by a discontinuous thermoplastic polymer layer. The acoustic lamina is reported to achieve very high Perm values, such as about 72 Perms. The disclosed wallcoverings are particularly well suited for those situations where sound damping and moisture permeability are both important, but where a smooth aesthetic appearance is not desired or can be sacrificed in favor of the excellent moisture permeability and sound damping properties. Specifically, the outer layer of the acoustic lamina is a relatively coarse woven fabric which provides a rough textured surface needed for good sound damping properties. Because of the rough textured surface it is not possible, or at least impracticable, to provide the acoustic lamina of the referenced application with a distinct, sharply-defined printed design or pattern because the printing would tend to deposit more ink on the higher areas and completely miss the recessed areas of the exposed surface.

Accordingly, there exist a need for a breathable wallcovering having a relatively higher permeability, yet which has a smooth outer exposed surface which can be printed with a design or pattern having sharply defined edges.

SUMMARY OF THE INVENTION

In accordance with the present invention, there is provided a breathable or moisture permeable wallcovering having a porous polymeric ply which is fused to and supported by a nonwoven substrate ply. The porous polymeric ply has a smooth, continuous, aesthetically pleasing appearance, while simultaneously achieving a moisture vapor permeability which prevents moisture from being trapped on or within a wall to which the wallcovering is applied. More specifically, the porous polymeric ply has a substantially macroscopic-continuity or pseudocontinuous character wherein a plurality or multiplicity of miniature or microscopic discontinuities or holes are randomly distributed. To the unaided eye the pseudocontinuous character of the polymeric ply appears to be a continuous, smooth film, the outer or exposed surface of which can be decorated such as by printing a decorative design or pattern using a suitable polymer-receptive ink.

The nonwoven substrate ply or backing is comprised of an array of hydroentangled synthetic polymeric fibers and cellulosic fibers which are physically entangled or mechanically interlocked. The hydroentangled nonwoven substrate is a strong, soft fabric wherein the fibers are more tightly or closely arranged together to provide a smoother, more aesthetically pleasing appearance relative to other nonwoven fabrics. The hydroentangled nonwoven ply has a relatively open and porous or reticular structure which allows for the free passage of air and moisture, such that the moisture permeability of the wallcovering of the present invention is generally controlled by the rate at which moisture is able to permeate the porous polymeric ply.

Because of the relative smoothness of the hydroentangled nonwoven substrate poly and the macroscopic-continuity or pseudocontinuous character of the polymeric ply, the outer or exposed surface of the polymeric ply can be provided with a printed decorative design or pattern having relatively smooth, sharply defined edges having an aesthetic appeal which is comparable to conventional smooth wallcoverings having a low moisture permeability.

On account of its relatively high permeability, the wallcovering of the invention aids in controlling or diminishing mildew growth between the wallcovering and the wall to which it is applied, even when significantly reduced amounts of fungicide are utilized in the porous polymeric ply.

Preparation of the breathable wallcoverings of the invention generally involves applying a thin plastisol coating onto a hydroentangled nonwoven substrate ply or backing. An important aspect of the invention is that the plastisol coating should be applied at a thickness which is sufficiently low to permit localized variations in fiber orientation and small variations in the thickness of the nonwoven substrate ply to cause highly localized flow which results in the formation of a multiplicity of miniature or microscopic discontinuities which are substantially invisible to the unaided eye and which are randomly distributed throughout the coating. The coating, however, should also be thick enough to allow the formation of a macroscopically continuous, smooth coating which can be thermally fused to form a porous polymeric ply having a smooth, continuous appearance onto which a sharply defined pattern or design can be printed. The plastisol coating is fused into a porous polymeric ply by heating the coating to a temperature in excess of the melting or fusion temperature of the polymeric resin or resins contained in the plastisol.

The two-ply breathable wallcovering of the invention can generally be printed with any desired design or pattern using conventional printing techniques, and can be embossed to provide an aesthetic texture as desired using conventional embossing or texturing techniques.

The breathable wallcovering of the invention can be applied to a wall or other substrate using conventional wallcovering paste, to provide a smooth aesthetically pleasing, decorative covering having a high moisture vapor permeability which is particularly useful and advantageous for decorating walls in highly humid geographic areas.

BRIEF DESCRIPTION OF THE DRAWING

The drawing shows a two-ply composite fabric or wallcovering in accordance with the invention.

PREFERRED EMBODIMENTS OF THE INVENTION

With reference to the drawing there is shown a two-ply composition fabric or wallcovering 10 in accordance with the invention. The wallcovering generally includes a porous polymeric ply 20 fused to a nonwoven substrate ply 30.

Breathable, as used herein, refers to the ability of the wallcovering to allow moisture vapor to be transmitted therethrough. That is, “breathability”, as used herein, is substantially synonymous with moisture permeability.

The breathability or moisture permeability of wallcoverings is most frequently and appropriately expressed quantitatively in units of “Perms”, which is a term used in the industry corresponding to grams of moisture (water) permeating a sample (e.g., a wallcovering) per square meter per hour under specified conditions.

“Porous” and “discontinuous”, as used herein, generally refers to the existence of a multitude of small holes, openings or gaps in the polymeric ply of the wallcovering which are responsible for the breathability or high moisture permeability of the wallcovering.

The breathable wallcoverings of the invention are generally comprised of a porous polymeric ply which is formed on and fused to a nonwoven substrate. The wallcovering is generally formed by applying a thin plastisol coating to the surface of the nonwoven substrate, and then heating the plastisol coating to a temperature which is sufficiently high to melt or fuse thermoplastic resins contained in the plastisol. By appropriately heating a suitable plastisol which has been appropriately applied to a suitable nonwoven substrate it is possible to produce a highly moisture permeable, two ply wallcovering having a relatively smooth surface onto which a decorative pattern or design having sharply-defined edges can be printed. The wallcovering in accordance with the invention generally has an exposed decorative surface which has a smoothness substantially equivalent to the smoothness of conventional vinyl wallcoverings having a low moisture permeability.

The nonwoven fabrics which are suitable for use with the invention generally include nonwoven cloths made by a hydroentanglement process wherein a web of fibers is treated with jets of high pressure water or other liquid which serves to entangle the fibers. The water or liquid jets force the fibers into orientations where the fibers individually are at various angles with respect to each other and become physically entangled. The resulting mat subjected to the hydroentanglement process can be characterized as a mass or an array of hydroentangled fibers which are generally more tightly entangled and more closely spaced together than other nonwoven fabrics. The hydroentangled nonwoven fabric has a smoother surface (i.e., a surface having smaller variances from an even surface) than other nonwoven fabrics. Hydroentangled fabrics are generally exceptionally strong and soft, and like most other nonwoven fabrics, consist of a porous or reticulate fibrous mass having a relatively high void volume through which air and moisture vapor can freely pass. Hydroentangled fabrics are well known and commercially available from, for example, the C. H. Dexter Corp., Windsor Locks, Conn. Methods of preparing hydroentangled nonwoven fabrics are described, for example, in U.S. Pat. No. 3,537,945.

The nonwoven, hydroentangled ply or backing can be made of generally any synthetic fiber such as polyester, nylon, acrylic, polyolefin or the like, any cellulosic fiber such as cotton or wool, mineral fibers such as glass, or combinations of any of the foregoing. Preferred, are blends of cellulosic and synthetic fibers. Specifically, it is preferred that the nonwoven ply be prepared or consist of a blend containing at least about 10 percent by weight of at least one synthetic polymeric fiber to provide the nonwoven ply with better strength properties such as improved tear resistance. It is also desirable that the total fiber content of the nonwoven ply be comprised of at least about 50 percent by weight of cellulosic fibers to provide improved absorption and adhesion character (i.e., the ability to adhere the wallcovering to a wall or other substrate using a conventional wallcovering adhesive). Particularly preferred are blends of polyester fiber and cellulosic fiber comprising from about 10 to about 50, more preferably from about 20 to about 40 percent by weight of polyester fibers, and from about 50 to about 90, more preferably from about 60 to about 80 percent by weight of cellulosic fibers.

The nonwoven ply preferably has a relatively smooth or even surface compared with most nonwoven mats or fabrics.

Suitable thicknesses for the nonwoven ply can vary, however, thicknesses ranging from abut 4 to about 40 mils (from about 0.1 mm to about 1.0 mm) are generally suitable, with thicknesses from between about 8 mils (0.2 mm) to about 25 mils (0.6 mm) being preferred. Fabric weight for the nonwoven ply can vary considerably, however, fabric weights from about 1.9 ounces per square yard (47 grams per square meter) to about 2.5 ounces per square yard (61 grams per square meter) are generally preferred.

Suitable plastisols for use with the invention generally include well known plastisol compositions consisting primarily of a dispersion of finely divided resin in a plasticizer. Suitable resins generally include a variety of thermoplastic resins which are capable of fusing and absorbing the plasticizer upon application of heat. Examples of thermoplastic resins which can be used include polyacryalates, polyvinyl acetate, polyamides, various acrylic copolymers, polyvinyl chloride and the like. For purposes of this specification, the term plastisol is meant to also embrace organisols which are a dispersion of a thermoplastic resin in a mixture of plasticizer and a carrier solvent. Plastisol compositions which can be used with the invention generally include from about 20 to about 200 parts of plasticizer, desirably from about 50 to about 80 parts of plasticizer and more preferably from about 60 to 70 parts of plasticizer, per 100 parts by weight of resin. Particularly preferred are polyvinyl chloride plastisols.

Suitable plasticizers for use in plastisol compositions are generally well known to the art and literature. Examples of plasticizers which can be used generally include nonvolatile organic liquids, and low melting organic solids. Examples of plasticizers which can be used include tallates, adipates, trimellitates, sebacate esters, epoxidized soybean oil, acetates, azelates, glutamates, aliphatic esters and aryl phosphates and aromatic or alkyl aromatic esters and mixtures thereof. Specific examples include butyl octyl phthalate, dioctyl phthalate, hexyl decyl phthalate, dihexyl phthalate, diiooctyl phthalate, dicapryl phthalate, di-n-hexyl azelate, diisononyl phthalate, dioctyl adipate, tricresyl phosphate, cresyl diphenyl phosphate, polymeric plasticizers, such as adipic acid polyester, azelaic acid polyester and sebacic acid polyester, isooctyl epoxy tallate, and mixtures thereof.

Examples of other conventional components which can be incorporated into the plastisol composition include various silicas such as precipitated silica, fumed colloidal silica, calcium silicate and the like, ultraviolet light absorbers, fungicides, barium-cadmiumzinc stabilizers, barium-cadmium stabilizers, zinc stabilizers, dibasic lead phosphite, antimony oxide, and pigments such as titanium oxide, red iron oxide, phthalocyanine blue or green, and the like. The pigments and other additives or compounding ingredients are used in effective amounts to control color, mildew, stabilization, etc. of the plastisol.

The plastisol composition can generally be applied to the nonwoven substrate ply by a variety of techniques which are known to be useful for applying a thin coating to a fabric substrate. Examples of techniques which might be suitable for applying the plastisol composition to the nonwoven substrate include knife coating, reverse roll coating, pad coating, and rotary screen coating. Particularly preferred is rotary screen coating. The key feature of the coating or plastisol application process is that the plastisol is applied very thinly to the nonwoven substrate ply such that highly localized flow of the plastisol composition due to localized variations in fiber orientation and thickness or unevenness of the surface of the nonwoven ply results in small discontinuities, holes or gaps, which upon fusion form miniature holes or pores in the fused polymeric ply. The plastisol coating is preferably applied to a thickness of from about 2 mils (0.05 mm) to about 4 mils (0.10 mm), and at a coating weight of from about 1.5 ounces per square yard (47 grams per square meter) to about 5.0 ounces per square yard (155 grams per square meter). The plastisol composition is preferably applied to the nonwoven substrate ply at a viscosity of from about 3000 centipoise to about 8000 centipoise. That is to say, the plastisol composition preferably has a viscosity of from about 3000 centipoise to about 8000 centipoise at the temperature at which it is applied to the substrate ply.

A particularly preferred method of applying the plastisol composition to the nonwoven substrate ply is by a rotary screen method. Rotary screen methods are generally well known to the art and literature. The rotary screen apparatus is generally comprised of a rotating cylindrical screen having an internal squeegee blade capable of squeezing the coating from the inside of the cylinder through the screen on to a substrate containing the outside of the screen. The applied coating weight and thickness is generally dependent upon the properties of the coating composition, such as viscosity, the pressure or gap between the squeegee and the screen, the screen size, the blade angle, etc. Adjustment of the foregoing parameters to achieve a desired coating weight and coating thickness are generally well known in the art. A screen size of from about 30 to about 60 mesh (LR Stock) is preferred, and a line speed (the rate at which the nonwoven substrate ply passes through the coating apparatus) is preferably from about 30 yards per minute (27 meters per minute) to about 60 yards per minute (55 meters per minute).

The plastisol coated nonwoven substrate is then generally passed through a heating oven to heat the plastisol coating to a temperature in excess of the fusion or melting temperature of the thermoplastic resins contained in the plastisol, thereby causing fusion and solidification of the plastisol composition into a porous, solid polymeric ply which is fused to the nonwoven substrate ply. The resulting two ply structure provides a breathable composite fabric suitable for use as a wallcovering.

The exposed face of the porous polymeric ply is preferably printed with a suitable polymer-receptive ink to form desirable decorative patterns and designs. Such inks are well known and can be applied by various methods of printing such as by Gravure, flexography, screen printing, jet printing, web printing, etc. The printing operation may be repeated many times, as needed, to vary the colors and designs. A particular advantage with the present invention is that the printed designs or patterns can be sharply defined, i.e., can have relatively smooth, even edges, on account of the relatively smooth, psuedocontinuous character of the polymeric ply.

The two ply composite fabric or wallcovering of the invention, whether printed or not, can be embossed to provide an aesthetically pleasing texture such as a simulated leather grain.

The two ply composite fabric or wallcovering of the invention generally have a moisture permeability of from about 25 perms to about 50 perms.

While in accordance with the patent statutes the best mode and preferred embodiment has been set forth, the scope of the invention is not limited thereto, but rather by the scope of the attached claims.

What is claimed is:

1. A process for preparing a breathable, decorative wallcovering, comprising:

applying a thin plastisol coating having an average weight of from about 1.5 ounces per sguare yard (47 grams per square meter) to about 5.0 ounces per square yard (155 grams per square meter) onto a nonwoven substrate ply comprising an array of hydroentangled fibers, said coating being applied at a thickness which is sufficiently low to cause formation of miniature discontinuities in said coating on account of localized variations in fiber orientation and thickness of said substrate ply, said coating thickness being sufficiently high to provide a coating which upon heating and fusing of thermoplastic resin contained in said coating forms a polymeric ply having an exposed smooth and continuous surface; and subsequently heating said plastisol coating to a temperature sufficient to cause fusion of thermoplastic resin contained in said plastisol to form a porous polymeric ply fused to said nonwoven substrate ply, said wall-covering having a moisture permeability of from about 25 to about 50 perms.

2. The process of claim 1, wherein said plastisol coating is applied at an average thickness of from about 2 mils (0.05 mm) to about 4 mils (0.10 mm).

3. The process of claim 2, wherein said plastisol coating is applied using a rotary screen with a squeegee blade, the screen size being from about 30 to about 60 mesh, and said plastisol coating having a viscosity of from about 3000 centipoise to about 8000 centipoise as it is being applied to said substrate.

4. The process of claim 2, wherein said nonwoven substrate ply has an average thickness of from about 8 mils (0.2 mm) to about 25 mils (0.6 mm), an average weight of from about 1.9 ounces per square yard (47 grams per square meter) to about 2.5 ounces per square yard (61 grams per square meter), and is comprised of from about 10 percent by weight to about 50 percent by weight of a synthetic polymeric fiber and the balance of said nonwoven substrate is comprised of cellulosic fibers.

5. The process of claim 4, wherein said synthetic fiber is polyester fiber and said porous polymeric ply is a fused polyvinyl plastisol.

* * * * *